United States Patent [19]

Schulten et al.

[11] 4,059,496
[45] Nov. 22, 1977

[54] PROCESS FOR THE PREPARATION OF SULFURIC ACID FROM SULPHUR DIOXIDE

[75] Inventors: Rudolf Schulten, Richterich; Friedrich Behr, Gross-Denkte, both of Germany

[73] Assignee: Rheinische Braunkohlenwerke Aktiengesellschaft, Cologne, Germany

[21] Appl. No.: 724,290

[22] Filed: Sept. 20, 1976

[30] Foreign Application Priority Data

Sept. 26, 1975 Germany .............................. 2542935

[51] Int. Cl.$^2$ .......................... C25B 1/22; C25B 1/02
[52] U.S. Cl. ..................................... 204/104; 204/129
[58] Field of Search ....................... 204/104, 128, 129

[56] References Cited

U.S. PATENT DOCUMENTS 3,291,708  12/1966  Juda ..................................... 204/128
3,524,801  8/1970  Parsi ..................................... 204/104

Primary Examiner—R. L. Andrews
Attorney, Agent, or Firm—Connolly and Hutz

[57] ABSTRACT

In a process for the electrolytic production of sulfuric acid by oxidation of sulfur dioxide in the presence of water in an anode compartment of an electrolysis cell and of hydrogen in the cathode compartment of the cell, the cathode compartment containing aqueous sulfuric acid as catholyte and being separated from the anode compartment by a hydrogen-ion transfer permitting membrane, the improvement which comprises introducing sulfur dioxide, water and hydrogen iodide or iodine, removing a mixture of aqueous sulfuric acid and hydrogen iodide from the anode compartment, separating the sulfuric acid from the mixture, and removing from the cathode compartment the hydrogen set free therein. The process gives a substantially lower overvoltage than prior art processes.

3 Claims, 1 Drawing Figure

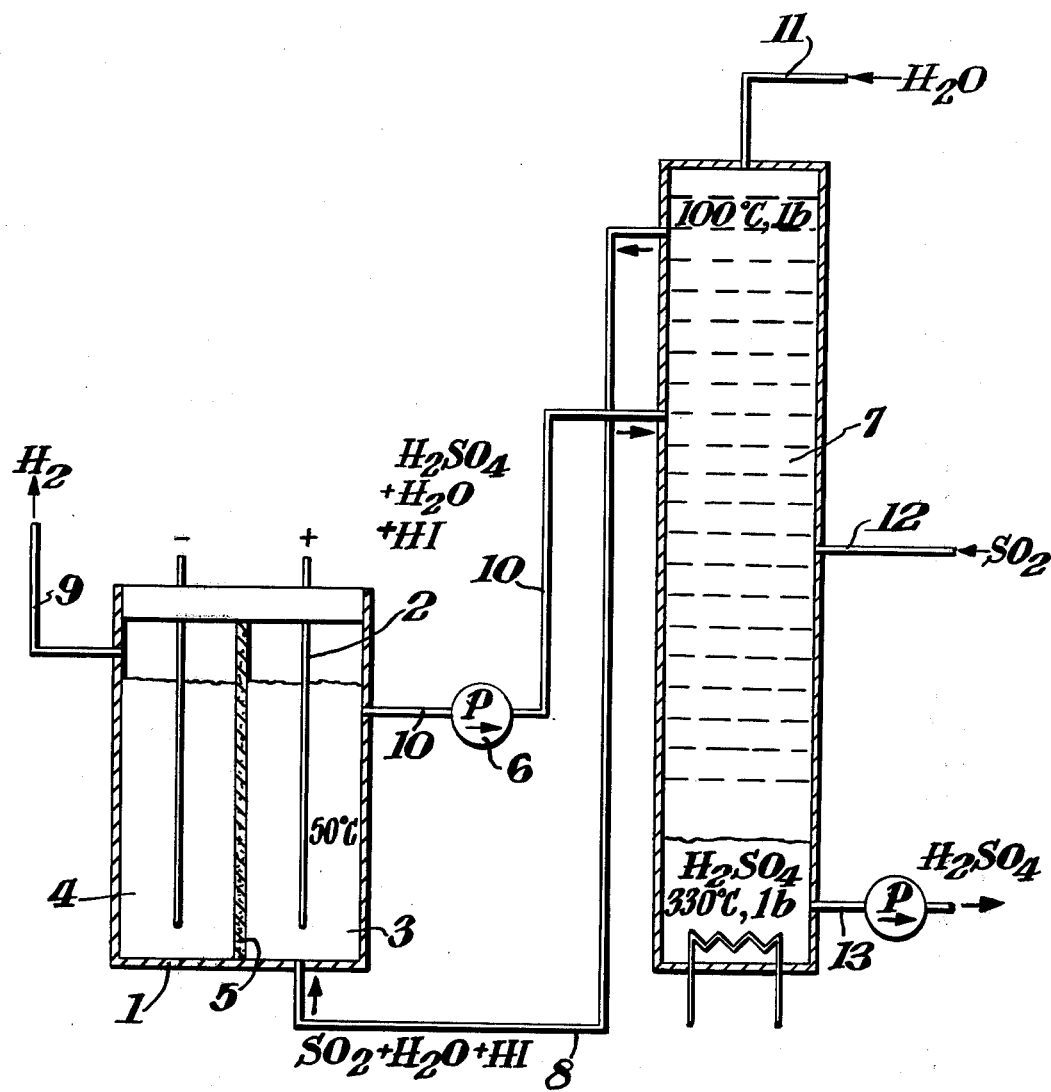

PROCESS FOR THE PREPARATION OF SULFURIC ACID FROM SULPHUR DIOXIDE

The invention relates to a process for the preparation of sulfuric acid by anodic oxidation of sulfur dioxide in the presence of water in an electrolytic cell.

It is known that the electrolyic reaction, which leads to the oxidation of sulfur dioxide in an aqueous solution, theoretically requires only a very low decomposition voltage. The reaction proceeds in accordance with the equations $$H_2SO_3 + H_2O = H_2SO_4 + 2 H^+ + 2 e$$

$$2 H^+ + 2e = H_2,$$

the decomposition voltage theoretically amounting to 0.17 volts. In carrying out this process for producing sulfuric acid by the reaction of sulfur dioxide and water, it has been shown, however, that the theoretical decomposition voltage is not achieved by far. Only an overvoltage of about 0.8 volts could be reached (Chem. Eng. Progr. 63 (4), 59–60, 1967).

A particularly advantageous specific embodiment of the process has now been found enabling a greater lowering of the overvoltage. It has been unexpectedly shown that by the addition of small quantities of hydrogen iodide or iodine in the electrolysis, the overvoltage can be lowered further. Accordingly, the invention relates to a process for the electrolytic preparation of sulfuric acid by anodic oxidation of sulfur dioxide in the presence of water with cathodic production of hydrogen, the oxidation of sulfur dioxide being carried out in the presence of hydrogen iodide or iodine in the anode chamber of an electrolytic cell, said chamber being separated from the cathode chamber by means of a hydrogen-ion-exchange membrane.

The sulfur dioxide and the water as well as the hydrogen iodide or the iodine individually or in composition are supplied in a known manner to the anode chamber. The iodide ions reaching the anode convert to elementary iodine and then extraordinarily quickly react with sulfurous acid, formed of water and sulfur dioxide, and further water in accordance with the equation $$I_2 + H_2SO_3 + H_2O = H_2SO_4 + 2 HI.$$

In this connection, the iodine occurs only in a so-called catalytic intermediate reaction. Obtained then is an overvoltage, which is below 0.75 volts, and amounts to generally 0.5–0.6 volts with an optimum consideration of energy consumption, sizes of apparatus and costs.

In principle, the customary electrolytic cells may be employed, the industrial materials of course having to be stable with respect to sulfurous acid or sulfuric acid and the other reaction participants. It should be observed that a sufficiently quick re-formation of the iodine can take place at the anode. Customary anodes may be employed whose surfaces are enlarged by respective designing. For example, the anolyte of aqueous sulfurous acid may be pumped in the cell or it may be circulated through the anode cells, the anolyte being standardized outside the electrolyte vessel, e.g., in a washer, to the desired concentration of the sulfuric dioxide and then being returned to the anode chamber. For example, a porous anode may be used through which flows the aqueous electrolytic solution in the direction toward the cathode. In such an anode, small bores may be made in the longitudinal direction for the sulfur dioxide to flow through so that within the porous anode material, a constant contact occurs between the gaseous sulfur dioxide and the aqueous electrolyte. The spent sulfur dioxide mixture is continuously supplemented by dissolving more sulfur dioxide in the anolyte.

In this connection, the anode may be designed to have a thickness of 1–3 cm, for example. It may be advantageous to introduce into the anode chamber small, stoichiometric excess quantities of $SO_2$ to make certain that only hydrogen iodide and no iodine is drawn off with the sulfuric acid from the cell. For this purpose gaseous sulfur dioxide may flow around the anode, for example. The anode material may be the customary industrial materials, e.g., graphite coated with a fine platinum film. With a respectively thickly shaped anode plate, the reaction of iodine can thus proceed practically within the anode.

The concentration of the anolyte should not rise excessively high, since in the strongly acid range, perhaps from a sulfuric acid concentration of 35%, the reaction becomes slower. The concentration should be in a range of about 30–45% (by weight). The content of hydrogen iodine should be between 1 – 3% (by weight), the amount of free iodine between about 0.3 – 1% (by weight). For the separation of the anode chamber from the cathode chamber, the customary hydrogen-ion-exchange membranes can be utilized, e.g., such as those of fluorinated polysulfonic acids. The cathode may be formed in an equally known manner and of customery material. Selected as the anolyte is an aqueous sulfuric acid, for example, with a concentration of about 10–35%. Generally, current densities of 3 amps/dm² to about 30 amps/dm² are chosen, yet higher current densities up to about 200 amps/dm² may also be used. In this connection, one works at temperatures of about 15° 14 100° C, especially 50° – 70° C, and optionally under elevated pressures of up to about 100 atmospheres. The removal of the resulting product from the anode or the cathode chamber takes place in a known manner. The sulfur dioxide to be reacted can be obtained in a known manner, e.g., by the combustion of sulfur in air or by the calcining of sulfurous ore, also by thermal splitting of gypsum, for example, in the presence of coke or of excess non-utilized surlfuric acid and by the reconduction of the thus-obtained sulfur dioxide into the process if the hydrogen requirement should be greater than of sulfuric acid. In these thermal processes it may be advantageous to utilize in a kown manner the waste heat of high-temperature nuclear reactors. The working up of the aqueous sulfuric acid drawn from the anode cell can take place in a customary manner, preferably at first by concentration by distillation.

The water obtained in this connection is suitably reconducted into the anode chamber together with the simultaneously resulting hydrogen iodide. The hydrogen iodide obtained may also be converted into iodine in a known manner, e.g., electrolytically or by oxidation with oxygen, and to introduce it into the anode chamber by itself or also in a mixture with the aqueous sulfurous acid.

The FIGURE of the drawing schematically illustrates a specific embodiment of the process.

In an electrolytic cell 1, the anode 2 is contacted by an aqueous solution saturated with sulfur dioxide and containing 3% of hydrogen iodide conducted through conduit 8. A portion of the sulfur dioxide (0.5 mol in stoichiometric excess) is added in gas form, since the dissolving capacity of this gas is relatively low. Anode compartment 3 is separated by a hydrogen-ion-permeable membrane 5 from the cathode compartment 4 from which the hydrogen is drawn off. The hydrogen developed in cathode 5 is drawn off through conduit 9. For working up of the aqueous solution containing about 35% of sulfuric acid formed in the anode compartment, the sulfuric acid-hydrogen iodide aqueous solution is introduced into the upper part of distillation column 7 through conduit 10 by pump 6. The solution still contains small portions of hydriodic acid aside from the sulfuric acid. The fresh reaction water is supplied through conduit 11 at the top of the column in an amount corresponding to the water reacted in the cell. At about the middle of the column 7, $SO_2$ is supplied through conduit 12 in such a amount as is converted to sulfuric acid in the course of the reaction. In the distillation column the sulfuric acid is concentrated in a downward direction, a full concentration being reached finally in the sump of the column at 330° C and a pressure of 1 bar. The resulting concentrated sulfuric acid is then removed from the system through conduit 13. The water, hydrogen iodide and sulfuric acid are drawn off at the top of the distillation column at a temperature of about 100° C and a pressure of 1 bar and conducted through conduit 8 into the anode chamber with about the same pressure.

What is claimed is:

1. In a continuous process for the electrolytic production of sulfuric acid by oxidation of sulfur dioxide in the presence of water in an anode compartment of an electrolysis cell and of hydrogen in the cathode compartment of said cell, said cathode compartment containing aqueous sulfuric acid as catholyte and being separated from the anode compartment by a hydrogen-ion transfer permitting membrane, the improvement which comprises continuously introducing to the anode compartment sulfur dioxide, water and a compound selected from the group consisting of hydrogen iodide and iodine, removing a mixture of aqueous sulfuric acid and hydrogen iodide from the anode compartment, separating the sulfuric acid from the said mixture, and removing from the cathode compartment the hydrogen set free therein.

2. The process of claim 1 in which gaseous sulfur dioxide is introduced in stoichiometric excess into the anode compartment.

3. The process of claim 1 in which the hydrogen iodide removed from the anode compartment in admixture with sulfuric acid is converted to iodine after separating off said sulfuric acid and the iodine is introduced into the anode compartment.

* * * * *